United States Patent [19]
Lu

[11] Patent Number: 5,386,961
[45] Date of Patent: Feb. 7, 1995

[54] MULTI-DIRECTIONAL MOUNTING UNIT FOR MOUNTING A BICYCLE LOCK ON A TUBULAR FRAME

[75] Inventor: Francisco Lu, Kaohsiung Hsien, Taiwan, Prov. of China

[73] Assignee: Interseng Hardware Company L.T.D., Kaohsiung Hsien, Taiwan, Prov. of China

[21] Appl. No.: 52,715

[22] Filed: Apr. 26, 1993

[51] Int. Cl.⁶ .................................................. A47F 5/00
[52] U.S. Cl. ................................ 248/223.4; 248/541; 248/229; 248/911; 248/912; 224/39
[58] Field of Search ................ 248/230, 229, 225.1, 248/224.4, 224.3, 223.4, 541, 558, 316.7, 911, 912, 225.31; 224/39, 30 R, 42.45 R

[56] References Cited

U.S. PATENT DOCUMENTS

| | | | |
|---|---|---|---|
| 3,313,508 | 4/1967 | Mancl | 248/229 |
| 3,967,475 | 7/1976 | Zane et al. | 224/39 X |
| 4,088,250 | 5/1978 | Schaefer | 224/39 X |
| 4,336,232 | 3/1984 | Zane et al. | 224/39 |
| 4,613,135 | 9/1986 | Rush | 248/225.1 X |
| 4,736,921 | 4/1988 | Zane et al. | 248/541 X |
| 5,076,526 | 12/1991 | Zane et al. | 248/541 X |
| 5,127,562 | 7/1992 | Zane et al. | 224/39 |
| 5,133,568 | 7/1992 | Balterman | 248/229 X |
| 5,156,110 | 10/1992 | Fuller | 248/912 X |
| 5,167,353 | 12/1992 | Hughes | 224/39 |

FOREIGN PATENT DOCUMENTS 29302  6/1912  United Kingdom ............. 224/30 R Primary Examiner—Karen J. Chotkowski
Attorney, Agent, or Firm—Ladas & Parry

[57] ABSTRACT

A multi-directional mounting unit is used to mount a bicycle lock on a tubular frame. The mounting unit includes a tubular mounting part that is to be secured tightly on the tubular frame, and a separate tubular retaining part that confines a receiving space to receive one end of a lock body of the bicycle lock therein. The retaining part has a retaining notch that extends from a top edge to an intermediate part thereof for retaining a shackle of the bicycle lock therein. One of the mounting part and the retaining part has an outer wall surface which is formed with at least one axially extending positioning rail that confines a longitudinal slide groove therein. The other one of the mounting part and the retaining part has an outer wall surface which is formed with at least one axially extending insert projection. A selected one of the insert projections is inserted into a selected one of the positioning rails so as to secure the retaining part on the mounting part.

6 Claims, 8 Drawing Sheets

MULTI-DIRECTIONAL MOUNTING UNIT FOR MOUNTING A BICYCLE LOCK ON A TUBULAR FRAME

BACKGROUND OF THE INVENTION

1. Field of the Invention

The invention relates to a mounting unit, more particularly to a multi-directional mounting unit for mounting a bicycle lock on a tubular frame.

2. Description of the Related Art

Presently, there are different kinds of bicycle frames which are available in the market. Some of these bicycle frames have a horizontal shaft which extends horizontally adjacent to a top end of the seat stay thereof.

A conventional bicycle lock includes an elongated lock body and a U-shaped shackle. A mounting unit is secured on the seat stay of the bicycle frame and is used to retain the lock body on the seat stay. Most mounting units cannot be used with a seat stay that has a horizontal shaft adjacent to the top end of the latter because of the relatively narrow space between the horizontal shaft and the seat stay.

FIG. 1 illustrates a conventional mounting unit which can be used with a seat stay that has a horizontal shaft adjacent to the top end of the latter. The mounting unit is a one-piece injection molded plastic part and includes a main body (11) and a retaining seat (12) formed on one side of the main body (11). The main body (11) is formed with an axially extending slit (111) and a spaced pair of outward flanges (112) on two sides of the slit (111). A press seat (14) and a locking bolt (15) cooperate with a wing nut (16) so as to narrow the space between the flanges (112) when retaining the lock body of a bicycle lock on the mounting unit. The retaining seat (12) has an axially extending slit (121) and a spaced pair of outward flanges (13) on two sides of the slit (121). The retaining seat (12) is used to secure the mounting unit on the bicycle frame. The slits (111, 121) of the main body (11) and the retaining seat (12) are parallel but are oriented in opposite directions.

Note that because the mounting unit is integrally formed, the orientation of the lock body of the bicycle lock relative to the bicycle frame cannot be changed. Therefore, the conventional mounting unit cannot be adapted for use with a wide variety of bicycle frame designs.

In the above-described mounting unit, a fastening unit, which includes the press seat (14), the locking bolt (15) and the wing nut (16), is employed to retain the lock body of the bicycle lock on the mounting unit. However, when a bicycle which incorporates the conventional mounting unit is driven at a relatively high speed, the resulting vibrations can cause loosening of the wing nut (16). The conventional mounting unit is thus unable to guarantee that the untimely removal of the bicycle lock from the bicycle frame will not occur. Furthermore, the fastening and unfastening operations of the fastening unit are time-consuming and cannot be conveniently accomplished.

SUMMARY OF THE INVENTION

Therefore, the objective of the present invention is to provide a multi-directional mounting unit for mounting a bicycle lock on a tubular frame, which mounting unit permits changes in the orientation of the bicycle lock relative to the tubular frame and ease of installation and removal of the bicycle lock therefrom.

Accordingly, a multi-directional mounting unit of the present invention is used to mount a bicycle lock which includes an elongated lock body and a U-shaped shackle on a tubular frame. The mounting unit comprises:

a tubular mounting part formed with an axially extending slit and a spaced pair of outward flanges disposed on two sides of the slit, the mounting part further having a screw fastener that extends across the outward flanges so as to secure tightly the mounting part on the tubular frame; and a separate tubular retaining part which confines a receiving space to receive one end of the lock body therein, the retaining part having a retaining notch that extends from a top edge to an intermediate part thereof, each of two opposite side walls that confine the retaining notch being provided with a spaced pair of rounded stop projections for retaining the shackle in the retaining notch.

One of the mounting part and the retaining part has an outer wall surface which is formed with at least one axially extending positioning rail that confines a longitudinal slide groove therein. The other one of the mounting part and the retaining part has an outer wall surface which is formed with at least one axially extending insert projection. A selected one of the insert projections is inserted into a selected one of the positioning rails so as to secure the retaining part on the mounting part.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Figure 1:
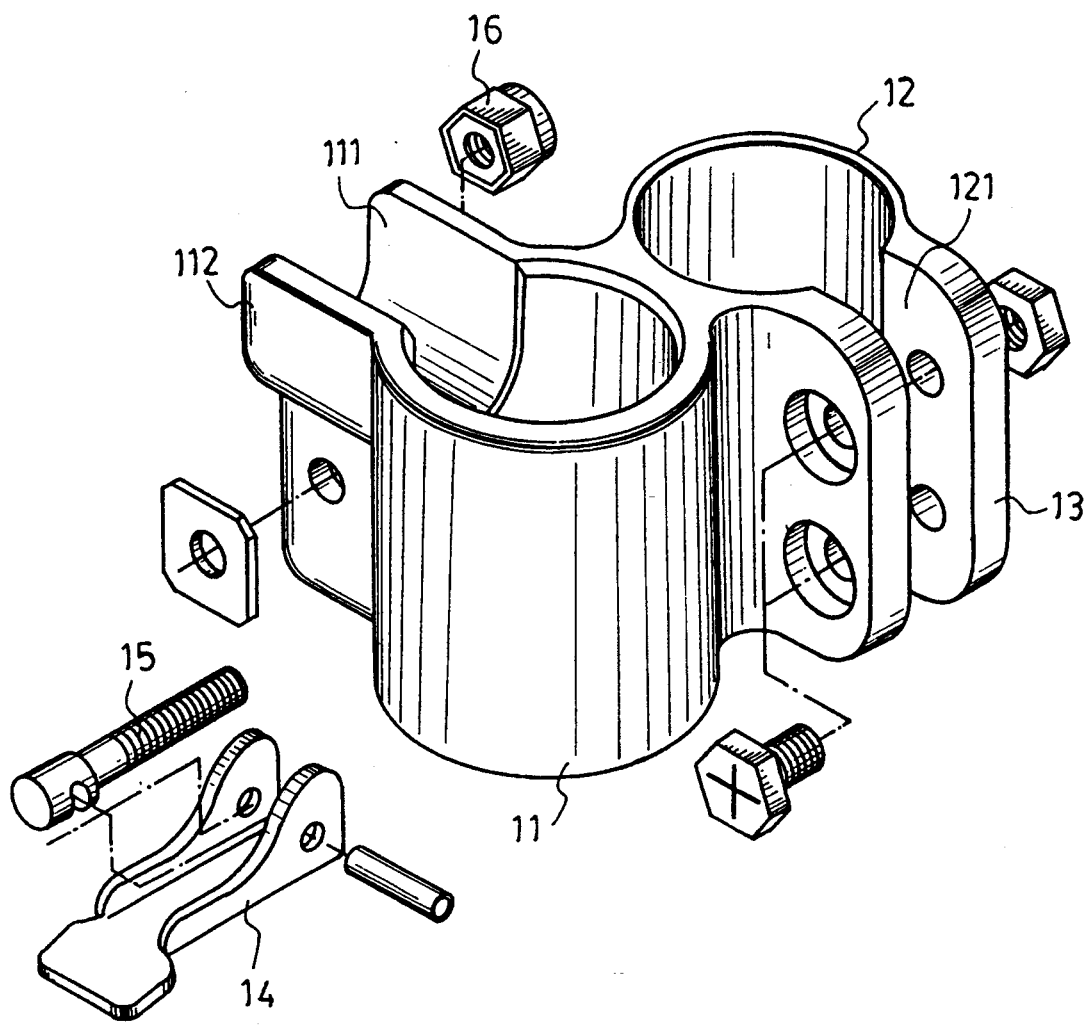
FIG. 1 is an exploded perspective view of a conventional mounting unit for mounting a bicycle lock on a tubular frame.
Figure 2:
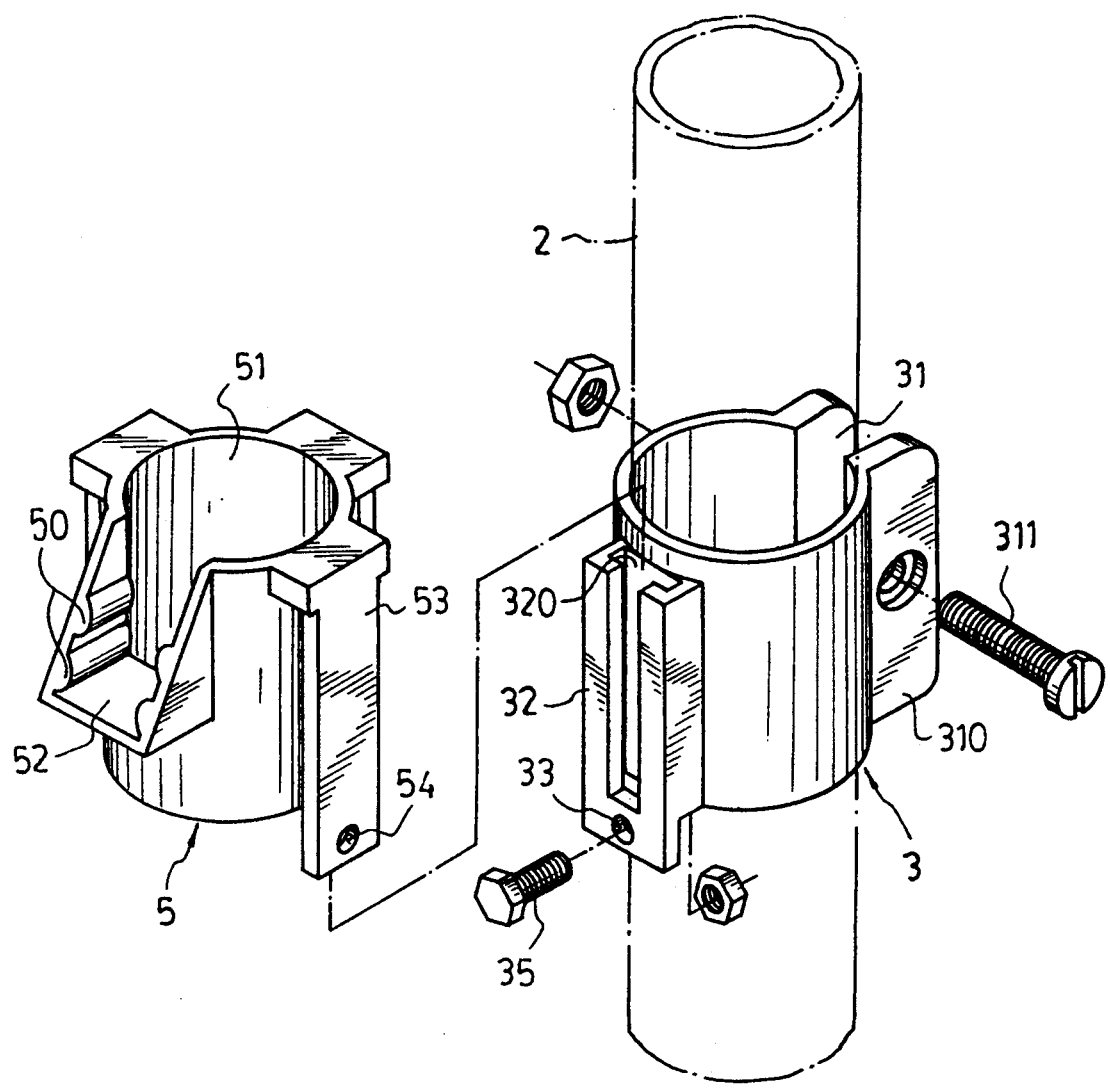
FIG. 2 is an exploded perspective view of the first preferred embodiment of a mounting unit for mounting a bicycle lock on a tubular frame in accordance with the present invention.
Figure 3:
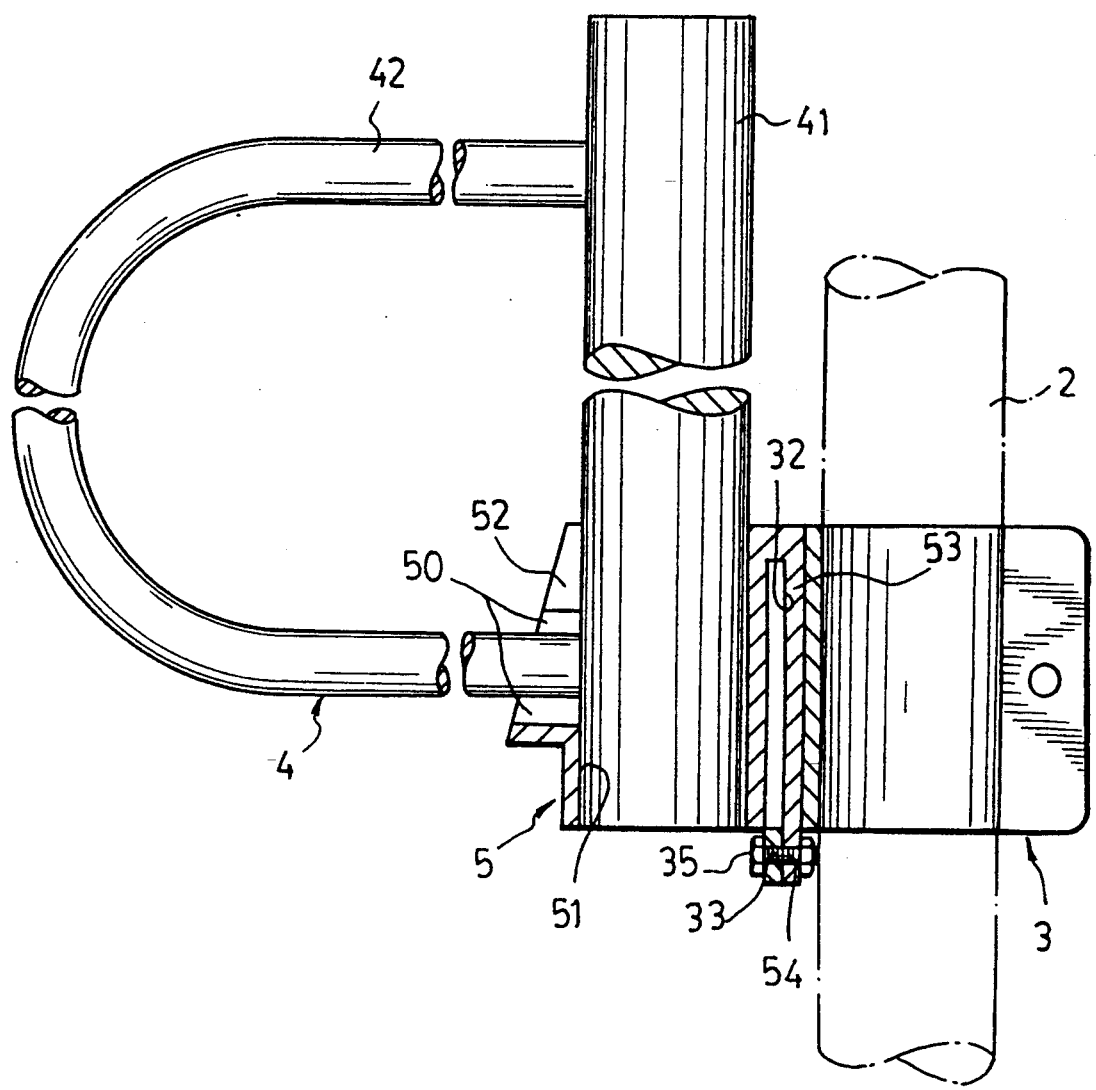
FIG. 3 illustrates the assembly of the first preferred embodiment.

Referring to FIGS. 2 and 3, the first preferred embodiment of a mounting unit according to the present invention is shown to comprise a tubular mounting part (3) to be secured on a tubular bicycle frame (2) and a tubular retaining part (5) for retaining a bicycle lock (4) therein. The mounting part (3) and the retaining part (5)

are one-piece injection molded plastic parts. The mounting part (3) is formed with an axially extending slit (31) and a spaced pair of outward flanges (310) on two sides of the slit (31). A screw fastener (311) extends across the outward flanges (310) so as to secure tightly the mounting part (3) on the bicycle frame (2). The mounting part (3) has an outer wall surface which is formed with at least one axially extending positioning rail (32). In this embodiment, only one positioning rail (32) is shown. The positioning rail (32) confines a longitudinal slide groove (320) therein and is formed with a radial through hole (33) adjacent to a lower end of the slide groove (320).

The retaining part (5) confines a receiving space (51) and has a retaining notch (52) that extends from a top edge of the retaining part (5) to an intermediate part of the latter. Each of two opposite side walls that confine the retaining notch (52) is provided with a spaced pair of rounded stop projections (50). The retaining part (5) further has an outer wall surface that is formed with at least one axially extending insert projection (53). In this embodiment, the retaining part (5) is formed with three spaced insert projections (53) which are spaced apart by 90°. After the mounting part (3) has been secured on the bicycle frame (2), a selected one of the insert projections (53) is inserted into the slide groove (320) of the positioning rail (32) of the mounting part (3), thereby aligning a through hole (54) that is formed in a lower end of the selected insert projection (53) with the through hole (33) of the positioning rail (32). A locking unit (35), such as a nut and bolt, extends through the through holes (33, 54) so as to secure the retaining part (5) on the mounting part (3).

To secure the conventional bicycle lock (4) on the mounting unit of the present invention, one end of the cylindrical lock body (41) of the bicycle lock (4) is extended into the receiving space (51) of the retaining part (5). The shackle (42) of the bicycle lock (4) extends into the retaining notch (52) of the retaining part (5) and is retained between the two pairs of rounded stop projections (50) on two sides of the retaining notch (52). Thus, the conventional bicycle lock (4) can be mounted securely on the mounting unit of the present invention without the need for screw fasteners.

Figure 4:
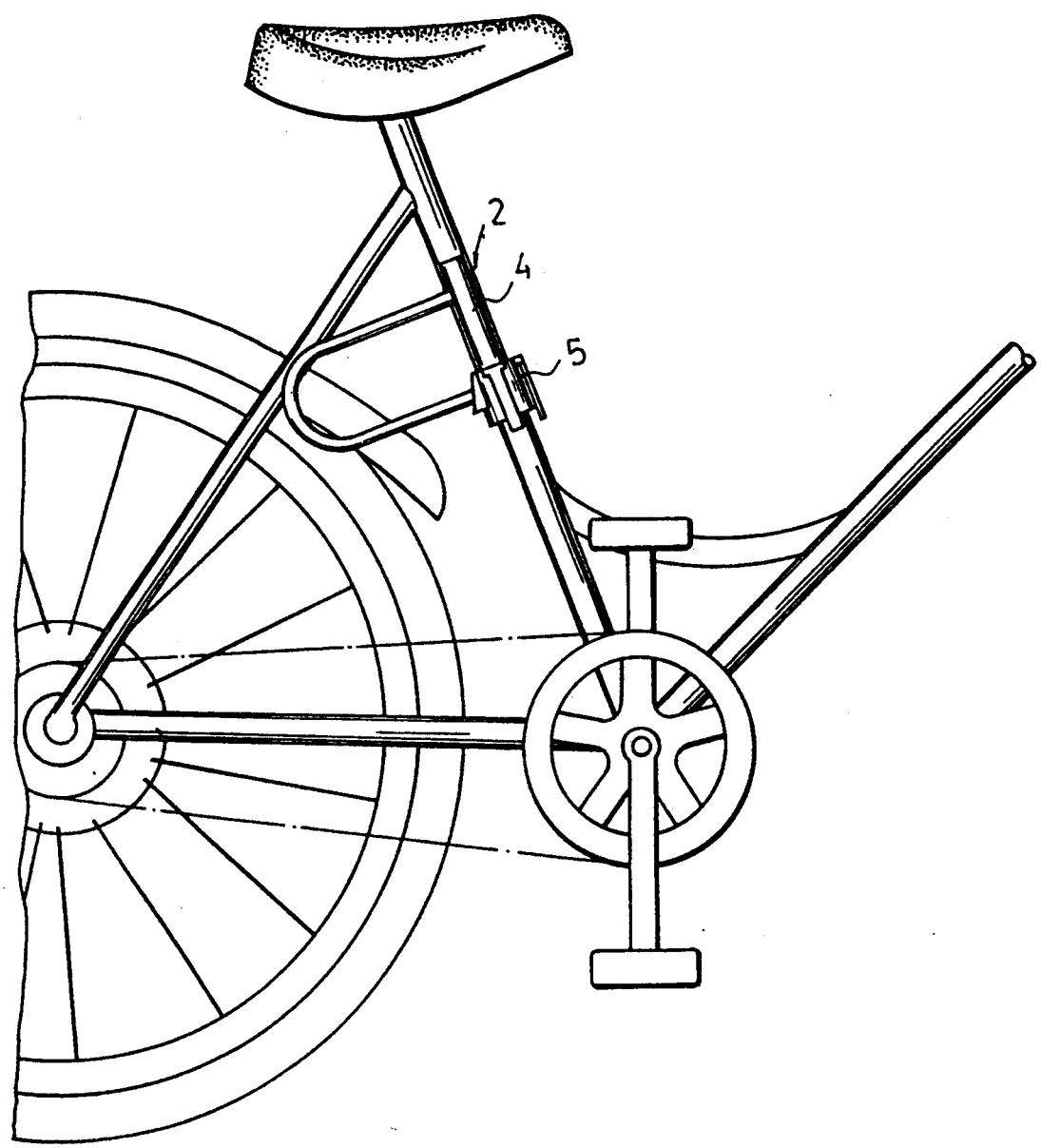
FIG. 4 illustrates the first preferred embodiment when in use.

Because of flexibility in the engagement between the mounting and retaining parts (3, 5), the mounting unit of the present invention can be adapted for use with a wide variety of bicycle frame designs. FIG. 4 illustrates the first preferred embodiment when installed on the bicycle frame (2) of a ladies' bicycle, which bicycle frame (2) does not include a horizontal shaft that extends from a top end of the seat stay. The retaining part is secured on the mounting part in such a manner that a bicycle lock (4) which is secured on the retaining part does not hinder pedaling movement of the legs of the user.

Figure 5:
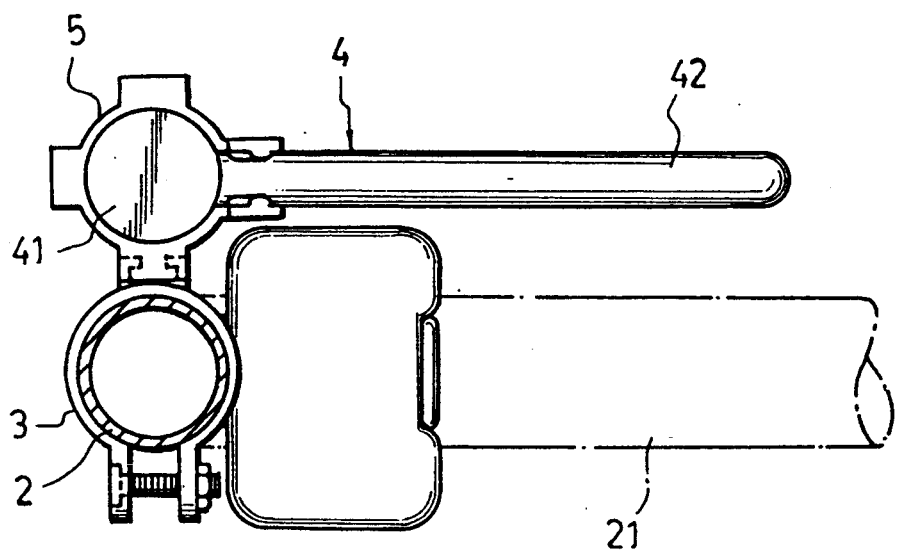
FIG. 5 is a top view of the first preferred embodiment when in use.

FIG. 5 is a top view of the first preferred embodiment when installed on a bicycle frame (2) that is provided with a horizontal shaft (21) which extends from a top end of the seat stay. The retaining part (5) is secured on the mounting part (3) in such a manner that the shackle of the bicycle lock (4) is parallel to and extends side-by-side with the horizontal shaft (21). Note that when the mounting unit of the present invention is installed, there is still room for mounting other bicycle accessories, such as a water canister or a tire pump, on the bicycle frame (2).

Figure 6:
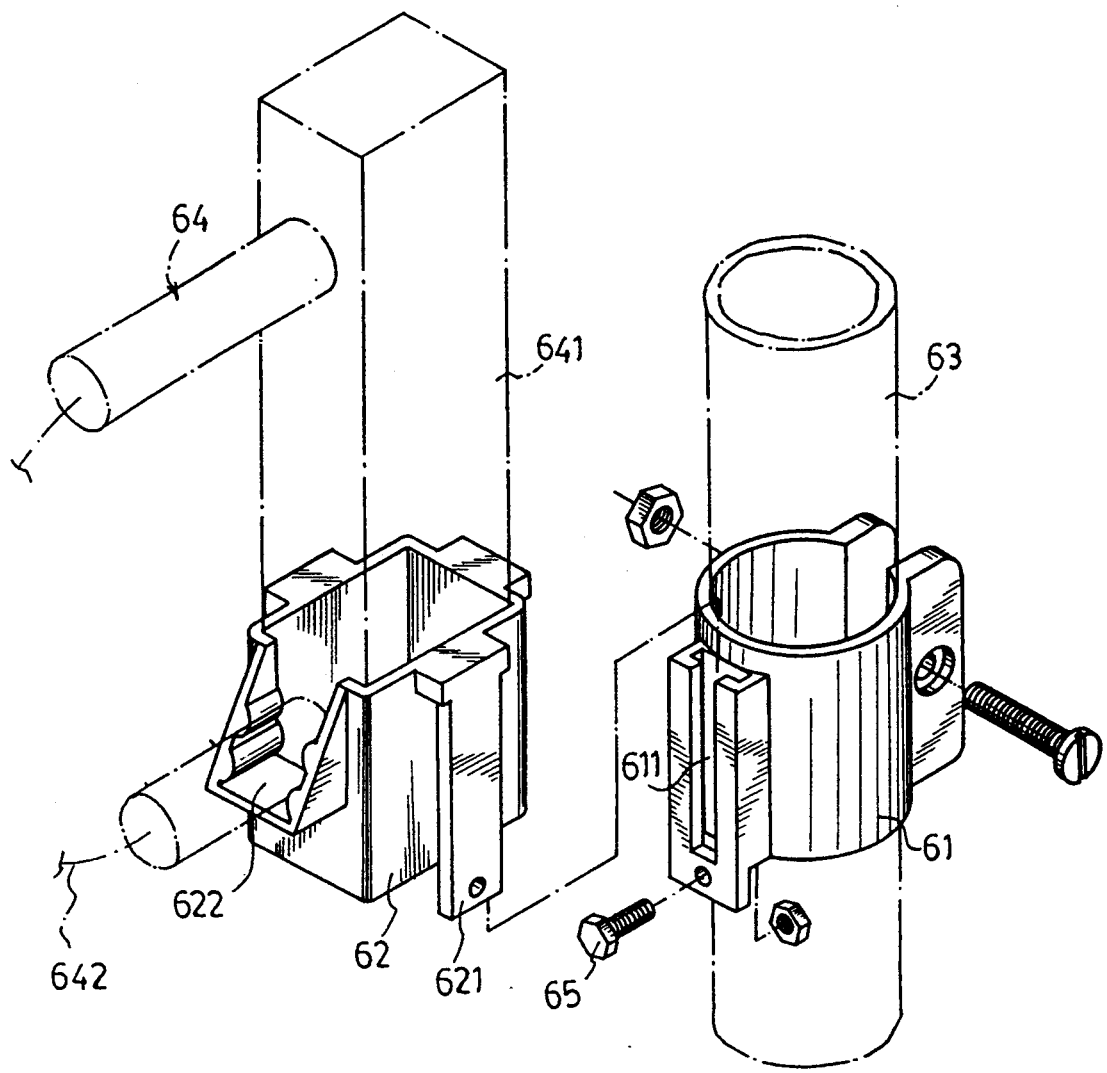
FIG. 6 is an exploded perspective view of the second preferred embodiment of a mounting unit for mounting a bicycle lock on a tubular frame in accordance with the present invention.

FIG. 6 is an exploded perspective view of the second preferred embodiment of a mounting unit according to the present invention. The second preferred embodiment is substantially similar to the previous embodiment and includes a tubular mounting part (61) to be secured on a bicycle frame (63) and a tubular retaining part (62) for retaining a bicycle lock (64) therein. The mounting part (61) has an outer wall surface which is formed with at least one axially extending positioning rail (611). In this embodiment, only one positioning rail (611) is shown. The retaining part (62) has an outer wall surface that is formed with at least one axially extending insert projection (621). In this embodiment, the retaining part (62) is formed with three insert projections (621). A selected one of the insert projections (621) engages the positioning rail (611) of the mounting part (61). A locking unit (65) secures the retaining part (62) on the mounting part (61). The retaining part (62) is adapted to receive the lock body (641) of a conventional bicycle lock (64) and has a retaining notch (622) that extends from a top edge of the retaining part (62) to an intermediate part of the latter. The shackle (642) of the bicycle lock (64) extends into and is retained in the retaining notch (642). Unlike the previous embodiment, the retaining part (62) is rectangular in cross-section and is adapted to receive an elongated rectangular lock body (641) therein.

Figure 7:
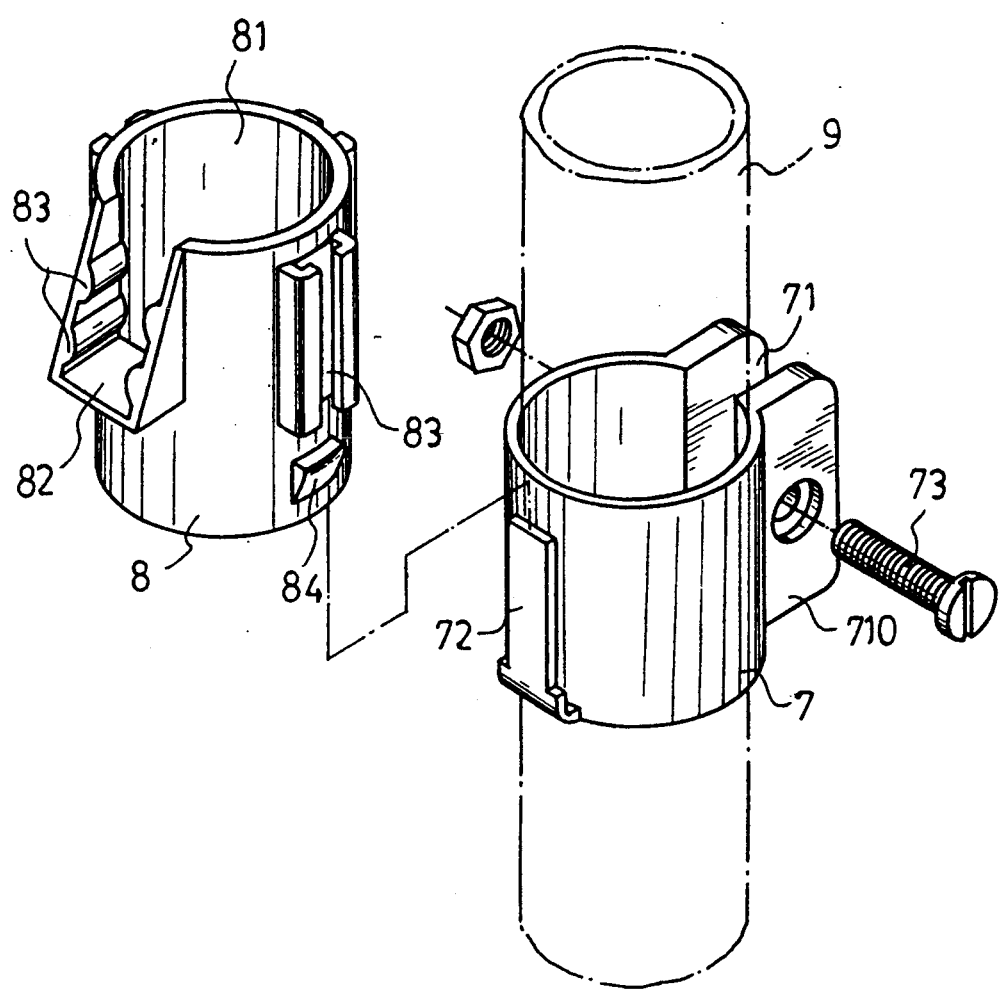
FIG. 7 is an exploded perspective view of the third preferred embodiment of a mounting unit for mounting a bicycle lock on a tubular frame in accordance with the present invention.

FIG. 7 is an exploded perspective view of the third preferred embodiment of a mounting unit according to the present invention. The third preferred embodiment is shown to comprise a tubular mounting part (7) to be secured on a bicycle frame (9) and a tubular retaining part (8) for retaining a bicycle lock (not shown) therein. The mounting part (7) and the retaining part (8) are one-piece injection molded plastic parts. The mounting part (7) is formed with an axially extending slit (71) and a spaced pair of outward flanges (710) on two sides of the slit (71). A screw fastener (73) extends across the outward flanges (710) so as to secure tightly the mounting part (7) on the bicycle frame (9). The retaining part (8) confines a receiving space (81) and has a retaining notch (82) that extends from a top edge of the retaining part (8) to an intermediate part of the latter. Each of two opposite side walls that confine the retaining notch (82) is provided with a spaced pair of rounded stop projections (83).

Unlike the previous two embodiments, the mounting part (7) has an outer wall surface which is formed with at least one axially extending flexible insert projection (72) that extends from adjacent to a bottom edge of the mounting part (7). Only one insert projection (72) is shown in this embodiment. The retaining part (8) has an outer wall surface that is formed with at least one axially extending positioning rail (83). Referring once more to FIG. 7, the retaining part (8) is formed with three positioning rails (83) which are spaced apart by 90°. Each of the positioning rails (83) has an open bottom. Stop projections (84) protrude from the outer wall surface of the retaining part (8) and are disposed below and are spaced from the open bottom of a corresponding one of the positioning rails (83).

Figure 9:
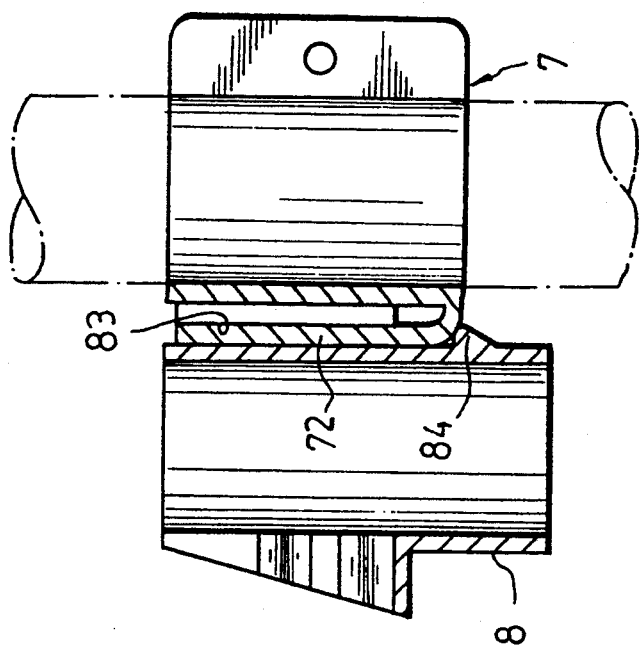
FIGS. 8 and 9 illustrate how the third preferred embodiment is assembled.
Figure 8:
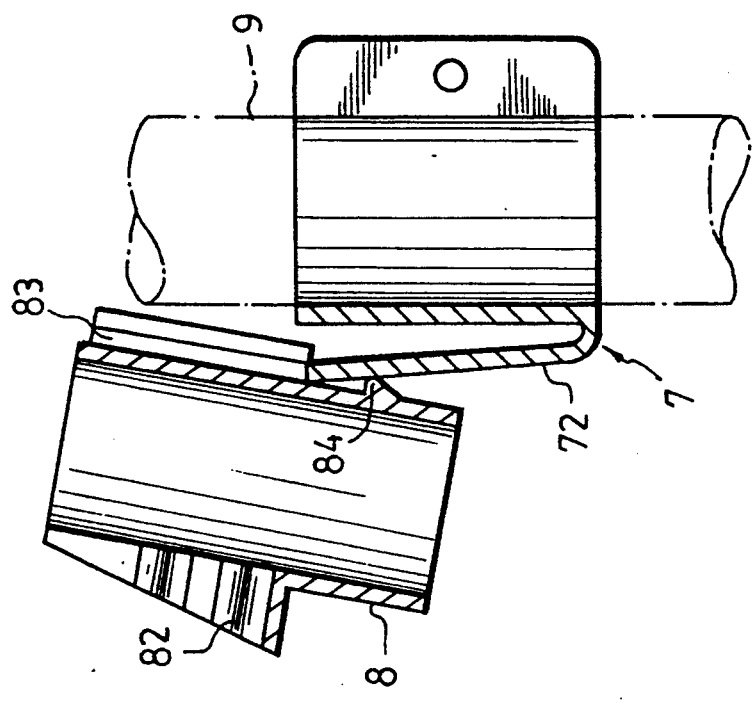

FIG. 8 illustrates how the third preferred embodiment is assembled. After the mounting part (7) has been secured on the bicycle frame (9), the distal end of the insert projection (72) is inserted into the selected one of the positioning rails (83) of the retaining part (8) via the open bottom of the selected positioning rail (83). The insert projection (72) can be maneuvered so as to enter fully into the selected positioning rail (83) due to the flexibility of the former. Referring to FIG. 9, the insert projection (72) has one end which rests on the stop projection (84), thereby positioning the insert projection (72) firmly within the positioning rail (83). This illustrates how the retaining part (8) of the third preferred embodiment is assembled onto the mounting part (7).

The advantages and characterizing features of the present invention are as follows:

1. The mounting unit of the present invention is adapted for use with a wide variety of bicycle frame designs. The orientation of a bicycle lock on the mounting unit can be changed in accordance with the structure of the bicycle frame in order to ensure that the bicycle lock does not hinder pedaling movement of the legs of the user.

2. Installation and removal of the bicycle lock from the mounting unit are easy to accomplish since no screw fastener is employed. To secure the bicycle lock on the mounting unit of the present invention, one end of the lock body is extended into the receiving space of the retaining part. The shackle of the bicycle lock is then extended into the retaining notch of the retaining part so as to be retained therein, thereby preventing untimely removal of the bicycle lock in the presence of relatively strong vibrations when a bicycle which incorporates the present invention is in use.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A multi-directional mounting unit for mounting a bicycle lock on a tubular frame, said bicycle lock including an elongated lock body and a U-shaped shackle, said mounting unit comprising:

a tubular mounting part formed with an axially extending slit and a spaced pair of outward flanges disposed on two sides of said slit, said mounting part further having a screw fastener that extends across said outward flanges so as to secure tightly said mounting part on said tubular frame; and a separate tubular retaining part which confines a receiving space to receive one end of said lock body therein, said retaining part having a retaining notch that extends from a top edge to an intermediate part thereof, each of two opposite side walls that confine said retaining notch being provided with a spaced pair of rounded stop projections for retaining said shackle in said retaining notch;

one of said mounting part and said retaining part having an outer wall surface which is formed with at least one axially extending positioning rail that confines a longitudinal slide groove therein;

the other one of said mounting part and said retaining part having an outer wall surface which is formed with at least one axially extending insert projection, a selected one of said insert projections being inserted into a selected one of said positioning rails so as to secure said retaining part on said mounting part.

2. The multi-directional mounting unit as claimed in claim 1, wherein each of said positioning rails is formed with a radial through hole adjacent to a lower end of said slide groove, and each of said insert projections is formed with a through hole that is aligned with said radial through hole of the selected one of said positioning rails when the selected one of said insert projections is inserted within said slide groove of the selected one of said positioning rails, said retaining part including a locking unit that extends through said through hole of the selected one of said positioning rails and said through hole of the selected one of said insert projection so as to secure said retaining part on said mounting part.

3. The multi-directional mounting unit as claimed in claim 1, wherein said retaining part is rectangular in cross-section.

4. The multi-directional mounting unit as claimed in claim 1, wherein each of said insert projections is flexible and is formed on said mounting part, each of said insert projections extending from adjacent to a bottom edge of said mounting part, each of said positioning rails being formed on said retaining part and having an open bottom, said retaining part further having at least one stop projection which protrudes from said outer wall surface of said retaining part and which is disposed below and spaced from said open bottom of a respective one of said positioning rails.

5. The multi-directional mounting unit as claimed in claim 1 wherein the retaining part has on its outer wall surface three insert projections.

6. The multi-directional mounting unit as claimed in claim 1 wherein the mounting part has on its outer wall surface three positioning rails.

* * * * *